(12) United States Patent
Jia

(10) Patent No.: US 11,985,071 B2
(45) Date of Patent: May 14, 2024

(54) METHOD AND APPARATUS FOR PROCESSING DATA PACKETS, DEVICE, AND STORAGE MEDIUM

(71) Applicant: ZTE CORPORATION, Guangdong (CN)

(72) Inventor: Qichen Jia, Guangdong (CN)

(73) Assignee: ZTE CORPORATION, Guangdong (CN)

(*) Notice: Subject to any disclaimer, the term of this patent is extended or adjusted under 35 U.S.C. 154(b) by 377 days.

(21) Appl. No.: 17/292,073

(22) PCT Filed: Sep. 18, 2019

(86) PCT No.: PCT/CN2019/106411
§ 371 (c)(1),
(2) Date: May 7, 2021

(87) PCT Pub. No.: WO2020/093793
PCT Pub. Date: May 14, 2020

(65) Prior Publication Data
US 2021/0399993 A1 Dec. 23, 2021

(30) Foreign Application Priority Data
Nov. 7, 2018 (CN) .......................... 201811317771.8

(51) Int. Cl.
*H04L 47/62* (2022.01)
*H04L 5/00* (2006.01)
(Continued)

(52) U.S. Cl.
CPC .......... *H04L 47/622* (2013.01); *H04L 5/0094* (2013.01); *H04L 49/901* (2013.01); *H04L 49/9042* (2013.01); *H04W 72/542* (2023.01)

(58) Field of Classification Search
None
See application file for complete search history.

(56) References Cited

U.S. PATENT DOCUMENTS

2003/0204794 A1* 10/2003 Barrett ...................... H04L 1/20
714/704
2004/0030967 A1* 2/2004 Walls .................... H04L 1/0045
714/704
(Continued)

FOREIGN PATENT DOCUMENTS

| CN | 1509025 A | 6/2004 |
| CN | 101848489 A | 9/2010 |

(Continued)

OTHER PUBLICATIONS

First Search Report for CN201811317771.8 dated Feb. 20, 2022.
(Continued)

*Primary Examiner* — Andrew C Oh
(74) *Attorney, Agent, or Firm* — KDW Firm PLLC

(57) ABSTRACT

Provided are method and apparatus for processing data packets, a device, and a storage medium that relate to the field of communications. The method includes: receiving multiple data packets of an identical service transmitted in multiple frequency bands, where each of the data packets carries arrangement indication information; and sorting the data packets based on the arrangement indication information carried in each of the data packets.

14 Claims, 7 Drawing Sheets

(51) Int. Cl.
*H04L 49/90* (2022.01)
*H04L 49/901* (2022.01)
*H04W 72/542* (2023.01)

(56) References Cited

U.S. PATENT DOCUMENTS

| | | | | |
|---|---|---|---|---|
| 2004/0062330 | A1* | 4/2004 | LeBlanc | H04Q 1/457 370/545 |
| 2004/0088742 | A1* | 5/2004 | LeBlanc | H04M 11/062 379/406.01 |
| 2006/0187846 | A1* | 8/2006 | Pelletier | H04W 28/06 370/252 |
| 2007/0047551 | A1* | 3/2007 | Conner | H04L 69/04 370/394 |
| 2009/0116445 | A1* | 5/2009 | Samar | H04W 36/02 455/436 |
| 2009/0323533 | A1* | 12/2009 | Ohta | H04W 36/023 370/236 |
| 2011/0103377 | A1* | 5/2011 | Hua | H04L 65/1053 370/352 |
| 2012/0069804 | A1* | 3/2012 | Kim | H04W 72/0453 370/329 |
| 2014/0269767 | A1* | 9/2014 | Djukic | H04L 1/1825 370/474 |
| 2015/0117357 | A1* | 4/2015 | Ozturk | H04W 28/0205 370/329 |
| 2016/0277957 | A1* | 9/2016 | Patel | H04W 76/16 |
| 2017/0012809 | A1* | 1/2017 | Lyons | H04L 5/0007 |
| 2017/0187496 | A1* | 6/2017 | Shalev | H04L 69/326 |
| 2017/0187846 | A1* | 6/2017 | Shalev | H04L 1/1835 |
| 2018/0206174 | A1 | 7/2018 | Zhou et al. | |

FOREIGN PATENT DOCUMENTS

| | | | | |
|---|---|---|---|---|
| CN | 103561472 | A | 2/2014 | |
| CN | 104579610 | A | 4/2015 | |
| CN | 104683262 | A | 6/2015 | |
| CN | 107294581 | A | 10/2017 | |
| CN | 107454276 | A | 12/2017 | |
| CN | 108243211 | A | 7/2018 | |
| EP | 3244581 | A1 | 11/2017 | |
| RU | 2682420 | C1 * | 3/2019 | H04L 12/14 |
| WO | 2011157190 | A2 | 12/2011 | |
| WO | 2011157190 | A3 | 12/2011 | |
| WO | 2018119153 | A2 | 6/2018 | |
| WO | 2018140153 | A2 | 8/2018 | |
| WO | 2018140153 | A3 | 8/2018 | |

OTHER PUBLICATIONS

First Office Action for CN201811317771.8 dated Mar. 8, 2022.
International Search Report for Patent Application No. PCT/CN2019/106411, dated Dec. 18, 2019, 2 pages.
European Search Report dated Jun. 29, 2022, issued for Application No. 19882495.5 (10 pages).

* cited by examiner

METHOD AND APPARATUS FOR PROCESSING DATA PACKETS, DEVICE, AND STORAGE MEDIUM

CROSS-REFERENCE TO RELATED APPLICATIONS

This application is a U.S. National Stage Application, filed under 35 U.S.C. 371, of International Patent Application No. PCT/CN2019/106411, filed on Sep. 18, 2019, which claims a priority to a Chinese Patent Application No. 201811317771.8 filed with the CNIPA on Nov. 7, 2018, disclosure of which are incorporated herein by reference in their entireties.

TECHNICAL FIELD

Embodiments of the present disclosure relate to, but are not limited to, the field of communications.

BACKGROUND

With the rapid development of communication technology, more and more devices can operate in two or more radio frequency bands simultaneously or non-simultaneously.

Generally, a device assigns sequence numbers (SNs) to data packets when sending the data packets. When the data packets are transmitted at the air interface, due to transmission delay and processes such as retransmission, a receiver receives disordered data packets. Therefore, after receiving the disordered data packets, the receiver needs to reorder the data packets according to the SNs and submit the reordered data packets to an upper layer for processing.

Currently, when a multi-band supported device transmits data packets, the process of assigning an SN to a data packet transmitted in each frequency band is separate. In this manner, after receiving data packets transmitted in different frequency bands, a receiving device cannot sort the data packets to restore an original order of the data packets and thus cannot obtain target data for a service.

SUMMARY

Embodiments of the present disclosure provide method and apparatus for processing data packets, a device, and a storage medium.

According to a first aspect, a method for processing data packets is provided. The method is applied to a receiving device. The method includes receiving multiple data packets of an identical service transmitted in multiple frequency bands, where each of the multiple data packets carries arrangement indication information; and sorting the multiple data packets based on the arrangement indication information carried in each of the multiple data packets.

According to a second aspect, a method for processing data packets is provided. The method is applied to a sending device. The method includes causing each of multiple data packets of an identical service to carry arrangement indication information; and transmitting the multiple data packets in multiple frequency bands.

According to a third aspect, an apparatus for processing data packets is provided. The apparatus includes a receiving module configured to receive multiple data packets of an identical service transmitted in multiple frequency bands, where each of the multiple data packets carries arrangement indication information; and a sorting module configured to sort the multiple data packets based on the arrangement indication information carried in the multiple data packets received by the receiving module.

According to a fourth aspect, an apparatus for processing data packets is provided. The apparatus includes a processing module configured to cause each of multiple data packets of an identical service to carry arrangement indication information; and a transmission module configured to transmit the multiple data packets in multiple frequency bands.

According to a fifth aspect, a receiving device is provided. The receiving device includes a memory and a processor. The memory stores a computer program. The processor is configured to execute the computer program to receive multiple data packets of an identical service transmitted in multiple frequency bands, where each of the multiple data packets carries arrangement indication information; and sort the multiple data packets based on the arrangement indication information carried in each of the multiple data packets.

According to a sixth aspect, a sending device is provided. The sending device includes a memory and a processor. The memory stores a computer program. The processor is configured to execute the computer program to cause each of multiple data packets of an identical service to carry arrangement indication information; and transmit the multiple data packets in multiple frequency bands.

According to a seventh aspect, a non-transitory computer-readable storage medium is provided. The non-transitory computer-readable storage medium stores a computer program configured to, when executed, cause the following operations to be performed: receiving multiple data packets of an identical service transmitted in multiple frequency bands, where each of the multiple data packets carries arrangement indication information; and sorting the multiple data packets based on the arrangement indication information carried in each of the multiple data packets.

According to an eighth aspect, a non-transitory computer-readable storage medium is provided. The non-transitory computer-readable storage medium stores a computer program configured to, when executed, cause the following operations to be performed: causing each of multiple data packets of an identical service to carry arrangement indication information; and transmitting the multiple data packets in multiple frequency bands.

BRIEF DESCRIPTION OF DRAWINGS

FIG. 1-2 is a flowchart of another method for processing data packets according to an embodiment of the present disclosure;

FIG. 2-1 is a schematic diagram of arrangement indication information carried in each of the data packets transmitted in two frequency bands;

FIG. 2-2 is a schematic diagram of assigning sequence numbers to data packets transmitted in different frequency bands;

FIG. 2-3 is a schematic diagram of sorting in the case where arrangement indication information is a serial number;

FIG. 3-1 is a schematic diagram of arrangement indication information carried in each of the data packets transmitted in two frequency bands;

FIG. 3-2 is a schematic diagram of assigning sequence numbers to data packets transmitted in different frequency bands;

FIG. 3-3 is a schematic diagram of sorting in the case where arrangement equipment indication information includes data packet continuity indication information and frequency band indication information;

FIG. 4-1 is a schematic diagram of arrangement indication information carried in each of the data packets transmitted in three frequency bands;

FIG. 4-2 is a schematic diagram of assigning sequence numbers to data packets transmitted in different frequency bands;

FIG. 4-3 is a schematic diagram of sorting in the case where arrangement indication information includes continuity indication information and frequency band indication information;

DETAILED DESCRIPTION

Figure 1:
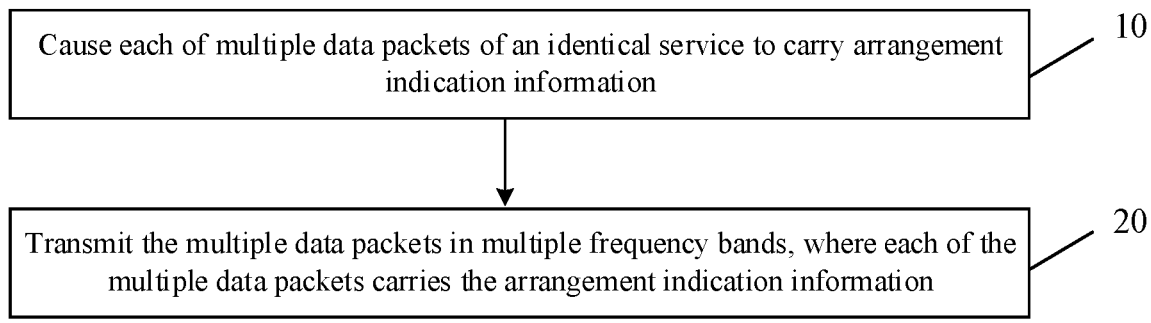
FIG. 1-1 is a flowchart of a method for processing data packets according to an embodiment of the present disclosure.

Objects, solutions and advantages of the present disclosure will be more apparent from a clear and complete description of solutions of embodiments of the present disclosure in conjunction with embodiments of the present disclosure and corresponding drawings. Apparently, the described embodiments are part, not all, of embodiments of the present disclosure. Based on the embodiments described herein, all other embodiments obtained by those having ordinary skill in the art without creative work are within the scope of the present disclosure.

A method for processing data packets according to an embodiment of the present disclosure may be performed by a receiving device. In embodiments of the present disclosure, the receiving device may be implemented by various kinds of user equipment (UE) or station (STA). For example, the receiving device may be a mobile receiving device such as a mobile phone, a personal digital assistant (PDA) or a tablet computer, or may be a receiving device such as a desktop computer. Here, the receiving device may receive data sent by, for example, a device such as a router, a switch or an access point (AP) that is located in the same local area network as the receiving device.

It is to be understood that in embodiments of the present disclosure, the receiving device may also be a device such as a router, a switch or an access point. In this case, the receiving device may receive data sent by, for example, various mobile devices in the same local area network as the receiving device.

Another method for processing data packets according to an embodiment of the present disclosure may be performed by a sending device. In embodiments of the present disclosure, the sending device may be implemented by various kinds of user equipment (UE) or station (STA). For example, the sending device may be a mobile sending device such as a mobile phone, a personal digital assistant (PDA) or a tablet computer, or may be a device such as a desktop computer. The sending device and the receiving device may be in the same local area network. Moreover, one device may serve as the sending device at a particular time and may serve as the receiving device at another time. That is, in embodiments of the present disclosure, the sending device and the receiving device are distinguished from each other in terms of sending function and receiving function. In some cases, a sending device may also serve as a receiving device, and a receiving device may also serve as a sending device.

Each of the receiving device and the sending device in embodiments of the present disclosure may have multiple media access control (MAC) addresses, and the multiple MAC addresses may be different from each other.

In some embodiments, when a multi-band supported sending device transmits data packets, a separate sequence number assignment counter is used to assign a sequence number to a data packet in each frequency band. Therefore, the process of assigning a sequence number to a data packet transmitted in each frequency band is separate. For example, m data packets are to be sent by a multi-band device. These data packets are transmitted in two frequency bands respectively. Data packets transmitted in frequency band A are assigned sequence numbers 1~x according to a sending order. Data packets transmitted in frequency band B are assigned sequence numbers 1~y according to a sending order. The sum of x and y is m. When a receiving device acquires the data packets transmitted in frequency band A and the data packets transmitted in frequency band B, since all or part of the sequence numbers are repetitive, the receiving device cannot sort the data packets to restore an original order of the data packets and thus cannot obtain target data for service.

Solutions according to embodiments of the present disclosure are described in detail hereinafter with reference to the drawings.

FIG. 1-1 is a flowchart of a method for processing data packets according to an embodiment of the present disclosure. Referring to FIG. 1-1, the method for processing data packets according to the embodiment of the present disclosure may be applied to a sending device and may include the steps below.

In step 10, each of multiple data packets of an identical service is caused to carry arrangement indication information.

In the embodiment of the present disclosure, the service may involve various data upload and download services and may cover various voice services and video services.

In the embodiment of the present disclosure, the arrangement indication information may be information related to an arrangement of the data packets so that a terminal receiving the data packets can sort the data packets according to the arrangement indication information. In the embodiment of the present disclosure, any information that can be used to determine an order of the arrangement of the data packets may be used as the arrangement indication information. The arrangement indication information may take various forms.

In one embodiment, the arrangement indication information includes a serial number for uniquely identifying a data packet. The serial number is determined according to a sending order of the data packets.

In the embodiment of the present disclosure, sending side and receiving side negotiate identifiers of supported frequency bands in advance, and the sending side adds, in each sent data packet, a serial number for uniquely identifying the data packet.

In the embodiment of the present disclosure, the sending device numbers the data packets in a predetermined manner.

For example, the sending device numbers the data packets ascendingly or descendingly according to the sending order of the data packets. The serial number for uniquely identifying a data packet may be in the form of, for example, one or more binary bits. Different data packets may have different binary numbers. For example, one data packet may be represented by 001, and the next data packet may be represented by 010.

In another embodiment, the arrangement indication information may be represented by a combination of various indication symbols. For example, the arrangement indication information may include a combination of two symbols. One symbol indicates a frequency band in which a data packet is located, the other symbol indicates whether the data packet and a previous data packet are transmitted continuously. Specifically, in another embodiment, the arrangement indication information includes at least frequency band indication information and data packet continuity indication information. The frequency band indication information indicates an identifier of a frequency band in which a previous data packet of a data packet carrying the frequency band indication information is located. The data packet continuity indication information indicates whether a data packet carrying the data packet continuity indication information and a previous data packet are transmitted continuously in an identical frequency band.

In this case, the arrangement indication information carried in a data packet may be as described in the table below.

| Frequency Band Indication Information | Data Packet Continuity Indication Information |
|---|---|

In the preceding table, the frequency band indication information indicates an identifier of a frequency band in which a previous data packet is located. The frequency band indication information of a first sent data packet indicates an identifier of a frequency band in which the first sent data packet is located. The data packet continuity indication information may indicate whether a data packet and the previous data packet of the data packet are transmitted continuously. For example, the data packet continuity indication information=0 may indicate that a data packet and the previous data packet of the data packet are transmitted continuously, and the data packet continuity indication information=1 may indicate that a data packet and the previous data packet of the data packet are transmitted discontinuously. Wireless data packets can be combined at the receiving side based on the frequency band indication information, the data packet continuity indication information, and the sequence numbers of the data packets. It is to be understood that, in embodiments of the present disclosure, whether a data packet and a previous data packet of the data packet are transmitted continuously means whether the data packet and the previous data packet of the data packet are transmitted continuously in an identical frequency band.

In step 20, the multiple data packets are transmitted in multiple frequency bands, where each of the multiple data packets carries the arrangement indication information.

In the embodiment of the present disclosure, the sending device may cause each to-be-sent data packet to carry the arrangement indication information. For example, the sending device may add the arrangement indication information into each to-be-sent data packet and send the data packets containing the arrangement indication information in multiple frequency bands.

For example, adding the arrangement indication information to the first sent data packet and adding the arrangement indication information to a non-first sent data packet are described. The arrangement indication information added to the first sent data packet is, for example, 001, where first two bits 00 in 001 indicate that the first sent data packet is sent in a frequency band having a frequency band identifier 00, and a last bit 1 in 001 indicates that the continuity of the first sent data packet is discontinuous. The arrangement indication information added to the non-first sent data packet is, for example, 001, where first two bits 00 in 001 indicate that a previous data packet of the non-first sent data packet is sent in a frequency band having a frequency band identifier 00, and a last bit 1 in 001 indicates that the continuity of the non-first sent data packet is discontinuous.

Of course, in embodiments of the present disclosure, the arrangement indication information may alternatively be represented in other forms (for example, decimal values) or may include a combination of more than two symbols (for example, may further include a reservation symbol and a use of the reservation symbol may be configured as desired).

In embodiments of the present disclosure, a data packet may include a packet header, a packet body, and a packet check sequence. The packet body may have a variable length. The arrangement indication information may be located in the packet header of the data packet. Alternatively, the arrangement indication information may be carried in the data packet.

After the receiving device acquires the multiple data packets transmitted in the multiple frequency bands, since each of the multiple data packets carries the arrangement indication information, the receiving device can sort the multiple data packets by using pieces of arrangement indication information carried in the multiple data packets. Therefore, it is able to solve the problem that data packets cannot be sorted since processes of assigning sequence numbers to data packets in respective frequency bands are separate from each other during multi-band transmission, thereby ensuring normal sorting of the multiple data packets and thus obtaining target data for service.

Figures 1, 2:
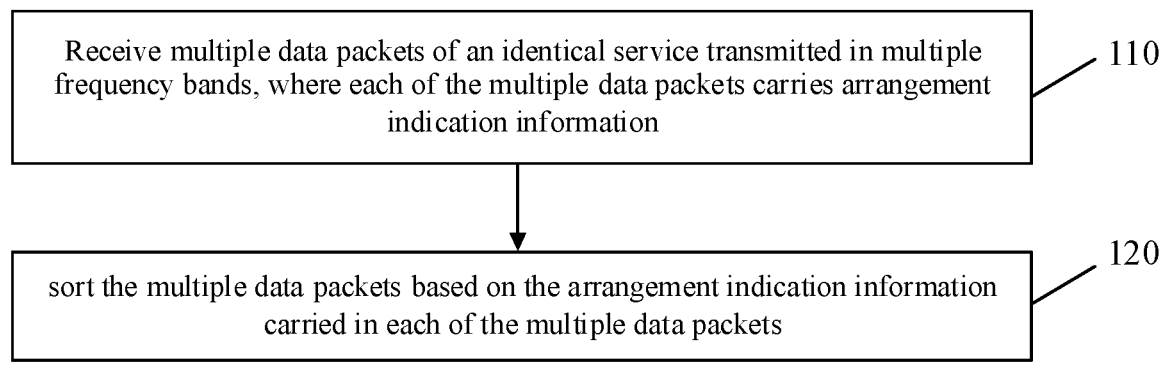

FIG. 1-2 is a flowchart of a method for processing data packets according to an embodiment of the present disclosure. Referring to FIG. 1-2, the method for processing data packets according to the embodiment of the present disclosure may be applied to a receiving device and may include the steps below.

In step 110, multiple data packets for an identical service transmitted in multiple frequency bands are received, where each of the multiple data packets carries arrangement indication information.

In the embodiment of the present disclosure, the data packets received in step 110 may be from various sending devices such as a router, an access point, and a cellphone. A sending device may be a device supporting multi-band transmission. A terminal may be a receiving device supporting multi-band transmission. A data packet may be a wireless data packet.

In the embodiment of the present disclosure, the identical service may involve various data upload and download services and may cover various voice services and video services.

In the embodiment of the present disclosure, the arrangement indication information may be information related to an arrangement of the data packets so that the terminal may sort the data packet according to the arrangement indication information. In the embodiment of the present disclosure, any information that can be used to determine an order of the arrangement of the data packets may be used as the arrangement indication information. The arrangement indication information may take various forms. The arrangement indication information may be in the form of, for example, one or more binary bits. Pieces of arrangement indication information of different data packets may be represented by different binary numbers. For example, the arrangement indication information of one data packet may be represented by 001, and the arrangement indication information of the next data packet may be represented by 010.

In another embodiment, the arrangement indication information may be represented by a combination of various indication symbols. For example, the arrangement indication information may include a combination of two symbols. One symbol indicates a frequency band in which a data packet is located, the other symbol indicates whether the data packet and a previous data packet are transmitted continuously. (For example, symbol=0 may indicate that a data packet and a previous data packet of the data packet are transmitted continuously, and symbol=1 may indicate that a data packet and a previous data packet of the data packet are transmitted discontinuously.) For example, the arrangement indication information is 0001; indication symbol 000 (the first three bits of 0001) may indicate the identifier of the frequency band in which the previous data packet of the data packet carrying the arrangement indication information is located; indication symbol 1 (the last bit of 0001) may indicate that the data packet carrying the arrangement indication information and the previous data packet are transmitted discontinuously.

Of course, in embodiments of the present disclosure, the arrangement indication information may alternatively be represented in other forms (for example, decimal values) or may include a combination of more than two symbols (for example, a reservation symbol may be further included, whose use may be configured as desired).

In embodiments of the present disclosure, a data packet may contain a packet header, a packet body, and a packet check sequence. The packet body may have a variable length. The arrangement indication information may be located in the packet header of the data packet. Alternatively, the arrangement indication information may be carried in the data packet.

In step 120, the multiple data packets are sorted based on the arrangement indication information carried in each of the multiple data packets.

In the embodiment of the present disclosure, after receiving a data packet, the terminal may acquire the arrangement indication information carried in the data packet from a predetermined position (for example, a specified position in the packet header of the data packet).

After acquiring the arrangement indication information carried in each of the data packets, the terminal can sort the multiple data packets based on the arrangement indication information. The data packets sorted in order form a data packet sequence.

After obtaining the data packet sequence, the terminal can parse the data packet sequence to obtain corresponding target data for service processing.

In the embodiment of the present disclosure, after the multiple data packets transmitted in the multiple frequency bands are acquired, since each of the multiple data packets carries the arrangement indication information, the multiple data packets can be sorted by using pieces of arrangement indication information carried in the multiple data packets. Therefore, it is able to solve the problem that data packets cannot be sorted since processes of assigning sequence numbers to data packets in respective frequency bands are separate from each other during multi-band transmission, thereby ensuring normal sorting of the received data packets by the terminal and thus obtaining target data for service.

In embodiments of the present disclosure, the arrangement indication information may take various forms. In an embodiment of the present disclosure, the arrangement indication information may include a serial number of a data packet. In the embodiment of the present disclosure, the sending device may cause, in a certain manner, each of the data packets acquired by the terminal to carry a serial number in advance (for example, the serial number of a data packet sent earlier is smaller than the serial number of a data packet sent later, or the serial number of a data packet sent earlier is greater than the serial number of a data packet sent later). Accordingly, step 120 may include sorting the multiple data packets in order of sizes of the serial numbers respectively carried in the multiple data packets. Since the serial number carried in each data packet received by the terminal can identify the data packet, the terminal can quickly complete a sort operation on the multiple data packets after acquiring the serial number of each of the data packets. This sorting mode is simple and efficient.

Here, sorting in order of sizes of the serial numbers may be in an descending order of sizes of the serial numbers or in an ascending order of sizes of the serial numbers.

A description is given hereinafter using examples. It is to be understood that in each example of the present disclosure, the arrangement indication information is added, in the form of a tag, to a data packet. In examples of the present disclosure, the number in ( ) indicates the arrangement indication information (Tag) of a data packet, the number in [ ] indicates a sequence number of a data packet in an original sending order, and the number in { } indicates a band identifier (for example, a band sequence number).

It is to be understood that in embodiments of the present disclosure, sequence numbers may indicate the sending order of data packets in one frequency band; serial numbers may be identifiers used in sorting data packets.

Figures 1, 2:
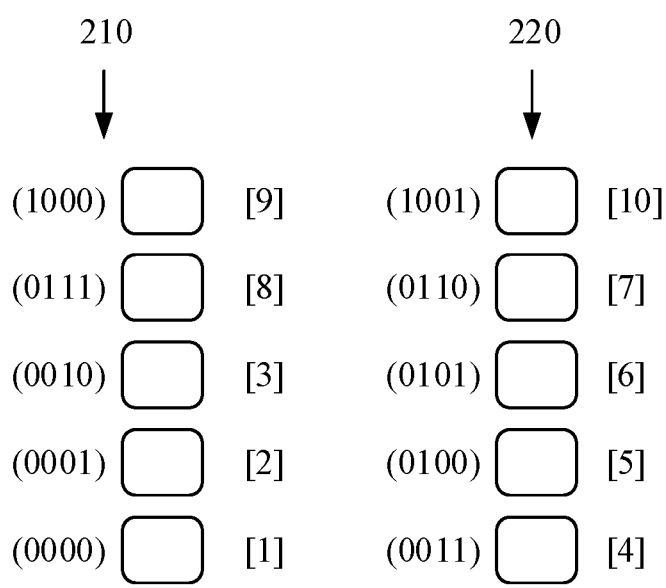
Figure 2:
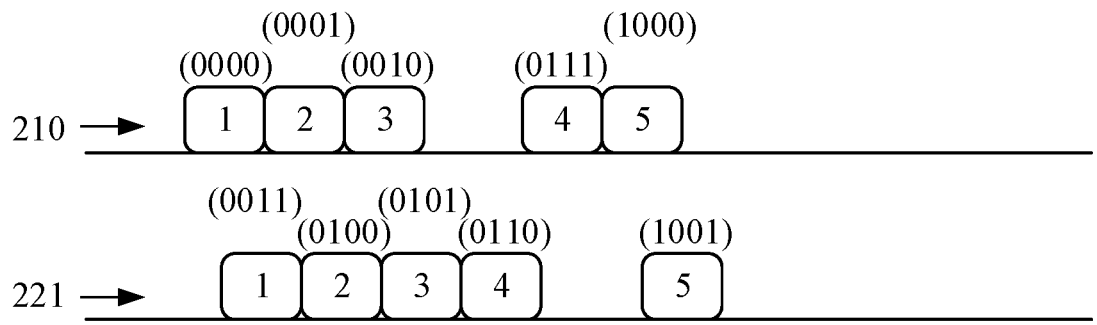
Figures 2, 3:
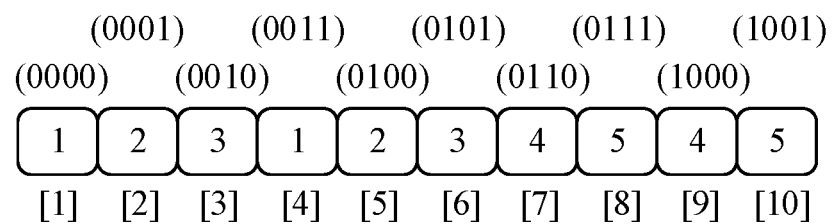
Figures 1, 3:
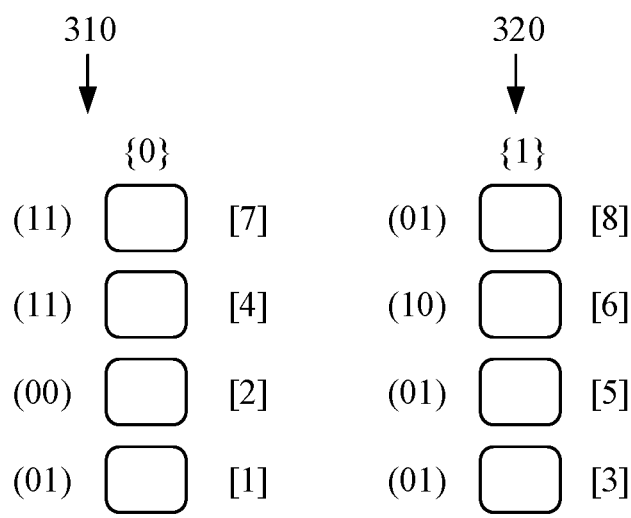
Figures 2, 3:
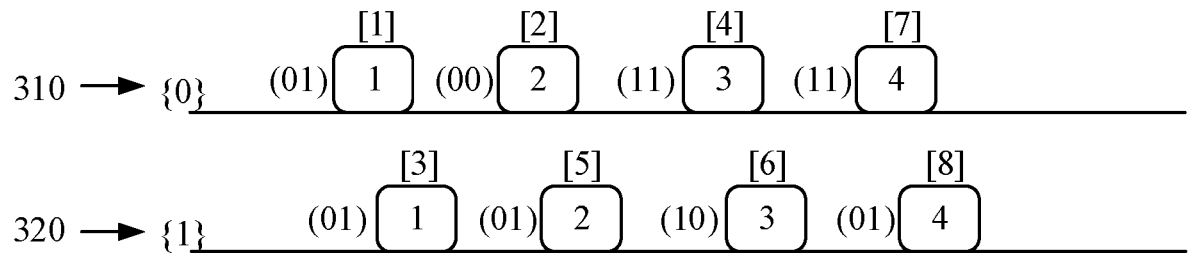
Figure 3:
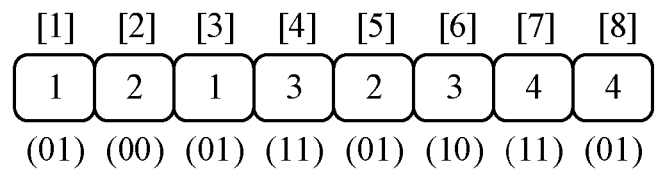

Referring to FIGS. 2-1 to 2-3, the reference numeral 210 indicates band 1, the reference numeral 220 indicates band 2, and each rectangular box indicates a data packet. FIGS. 2-1 to 2-3 exemplarily show the case where 10 data packets are transmitted in two frequency bands (for example, band 1 and band 2). FIG. 2-1 is a schematic diagram of arrangement indication information carried in each of the data packets transmitted in two frequency bands. FIG. 2-2 is a schematic diagram of assigning sequence numbers to data packets transmitted in different frequency bands. FIG. 2-3 is a schematic diagram of sorting in the case where arrangement indication information is a serial number.

As shown in FIG. 2-1, data packets in the original order [1][2][3][8][9] are sent in band 1, and pieces of arrangement indication information (in the form of tag) added to these data packets are, for example, (0000), (0001), (0010), (0111), and (1000) respectively; data packets in the original order [4][5][6][7][10] are sent in band 2, and pieces of arrangement indication information (in the form of tag) added to these data packets are, for example, (0011), (0100), (0101), (0110), and (1001) respectively.

FIG. 2-2 shows that, when a sending side sends wireless data packets in two frequency bands, the sending side assigns sequence numbers to data packets in each frequency band separately. The number in each box of FIG. 2-2 indicates the sequence number of a data packet. FIG. 2-3 shows that after receiving data packets, a receiving device sorts disordered tags in an ascending order. By sorting disordered tags in the ascending order, data packets whose sequence numbers are repetitive under multiple bands can be sorted and combined in order.

In embodiments of the present disclosure, data packets may be sorted according to serial numbers as described in the preceding text or may be sorted in other manners. In another embodiment of the present disclosure, the arrangement indication information may include data packet continuity indication information and frequency band indication information. The data packet continuity indication information may indicate transmission continuity between two data packets. For example, the data packet continuity indication information may indicate whether a current data packet and a previous data packet are transmitted continuously in the same frequency band. The frequency band indication information may indicate a frequency band in which a data packet is located. For example, the frequency band indication information may indicate an identifier (for example, a band sequence number) of a frequency band in which a previous data packet of a current data packet is located. Accordingly, step 120 may include determining a first sent data packet from the multiple data packets; and sorting the multiple data packets according to the data packet continuity indication information and the frequency band indication information carried in each data packet starting from a next data packet of the first sent data packet. The manner of sorting the data packets based on the data packet continuity indication information and the frequency band indication information according to embodiments of the present disclosure ensures high-accuracy and verifiability of sorting of the data packets.

In the embodiment of the present disclosure, in the process of sorting the data packets, it is feasible to first determine the first sent data packet and then sort the data packets from the first sent data packet. Moreover, in the embodiment of the present disclosure, to-be-sorted data packets can each have a sequence number, the data packet continuity indication information may indicate whether a data packet carrying the data packet continuity indication information and a previous data packet of the data packet are transmitted continuously, and the frequency band indication information may indicate an identifier of a frequency band in which a previous data packet of a data packet carrying the frequency band indication information is located.

In one embodiment, it is feasible to acquire the first sent data packet from the multiple data packets by determining the first sent data packet based on the sequence number and the frequency band indication information of each of the multiple data packets.

In the embodiment of the present disclosure, the first sent data packet is a data packet sent first in the data packet sequence. The first sent data packet may be determined in various manners. For example, it is feasible to specify one data packet from data packets each having a sequence number of 1 which are transmitted in respective frequency bands to serve as the first sent data packet. It is feasible to specify one data packet by using an identifier. This manner of specifying the first sent data packet is applicable only to data packets having sequence numbers of 1. As another example, it is feasible to acquire, from the multiple data packets, data packets having sequence numbers of 1 which are transmitted in respective frequency bands and determine, from the data packets having sequence numbers of 1, a data packet whose frequency band indication information indicates a band identifier that is the same as an identifier of a frequency band in which the data packet is located to be the first sent data packet. Hence, it is possible to ensure that the acquired first sent data packet is relatively accurate, thereby ensuring that subsequent sorting from the first sent data packet is high-accurate.

However, it is to be understood that in embodiments of the present disclosure, if a terminal/receiving device is not aware of the sequence numbers of the data packets, it is also feasible for the sending device to specify one data packet as the first sent data packet (for example, it is feasible for the sending device to specify one data packet as the first sent data packet by using an identifier). That is, in embodiments of the present disclosure, in the process of determining the first sent data packet, it is not a must for the terminal to acquire the sequence numbers of the data packets.

In step 120, it is feasible to sort the multiple data packets based on the data packet continuity indication information and the frequency band indication information carried in each of the multiple data packets by: sorting the multiple data packets based on the sequence number, the data packet continuity indication information, and the frequency band indication information of each of the multiple data packets.

In the embodiment of the present disclosure, the operation of determining the first sent data packet based on the sequence number and the frequency band indication information of each of the data packets ensures fast and accurate acquisition of the first sent data packet; the operation of sorting the multiple data packets from the first sent data packet based on the sequence number, the data packet continuity indication information, and the frequency band indication information of each of the data packets ensures high-accurate sorting of the data packets.

In a possible implementation of embodiments of the present disclosure, for data packets after the first sent data packet, the process of sorting the data packets based on the sequence number, the data packet continuity indication information, and the frequency band indication information of each of the data packets is described below.

First, an i-th data packet is acquired from the data packets and used as a to-be-sorted target data packet, where i is an integer greater than or equal to 2. The i-th data packet is after the first sent data packet. Data packets before the i-th data packet and in the frequency band in which the i-th data packet is located have all been sorted.

Then, it is determined whether the data packet continuity indication information carried in the to-be-sorted target data packet indicates that the to-be-sorted target data packet and a previous data packet of the to-be-sorted target data packet are transmitted continuously.

In response to the data packet continuity indication information carried in the to-be-sorted target data packet indicating that the to-be-sorted target data packet and the previous data packet of the to-be-sorted target data packet are transmitted continuously, the to-be-sorted target data packet is sorted, and an (i+1)-th data packet is used as a target data packet to be sorted next time. The (i+1)-th data packet is the next data packet in the frequency band in which the i-th data packet is located.

In response to the data packet continuity indication information carried in the to-be-sorted target data packet indicating that the to-be-sorted target data packet and the previous data packet of the to-be-sorted target data packet are transmitted discontinuously, an unsorted data packet having the minimum sequence number in each frequency band other than the frequency band in which the to-be-sorted target data packet is located is acquired; and a target specified data packet is acquired from all unsorted data packets having the minimum sequence numbers in frequency bands other than the frequency band in which the to-be-sorted target data packet is located, the target specified data packet is sorted, and a next data packet in the frequency band in which the target specified data packet is located is determined to be a new target data packet to be sorted next time. The target specified data packet is a data packet whose frequency band indication information indicates an identifier that is the same as an identifier of a frequency band in which a previous data packet in a current sort is located. That is, the identifier indicated by the frequency band indication information of the target specified data packet is the same as the identifier of the frequency band in which the last data packet that has been sorted is located.

It is to be understood that when the (i+1)-th data packet is used as a new to-be-sorted target data packet and sorted, the preceding process of processing the to-be-sorted target data packet can be repeated. That is, it is determined whether the data packet continuity indication information carried in the to-be-sorted target data packet (that is, the (i+1)-th data packet) indicates that the to-be-sorted target data packet and a previous data packet of the to-be-sorted target data packet are transmitted continuously. In response to the data packet continuity indication information carried in the to-be-sorted target data packet (that is, the (i+1)-th data packet) indicating that the to-be-sorted target data packet and the previous data packet of the to-be-sorted target data packet are transmitted continuously, the (i+1)-th data packet is sorted, and an (i+2)-th data packet is used as a target data packet to be sorted next time. The (i+2)-th data packet is the next data packet in the frequency band in which the (i+1)-th data packet is located. In response to the data packet continuity indication information carried in the to-be-sorted target data packet indicating that the to-be-sorted target data packet and the previous data packet of the to-be-sorted target data packet are transmitted discontinuously, an unsorted data packet having the minimum sequence number in each frequency band other than the frequency band in which the (i+1)-th data packet is located is acquired; and a target specified data packet is acquired from all unsorted data packets having the minimum sequence numbers in frequency bands other than the frequency band in which the to-be-sorted target data packet is located, the target specified data packet is sorted, and the next data packet in the frequency band in which the target specified data packet is located is determined to be a new target data packet to be sorted next time.

In the embodiment of the present disclosure, the manner of sorting the data packets based on the sequence number, the data packet continuity indication information, and the frequency band indication information of each of the data packets ensures accurate, efficient and simple sorting of the data packets in the case where sequence numbers are assigned to data packets in respective frequency bands separately.

A detailed description is given hereinafter in conjunction with the drawings. Referring to FIGS. 3-1 to 3-3, the reference numeral 310 indicates band 1, the reference numeral 320 indicates band 2, and each box indicates a data packet. The number in each box of FIGS. 3-2 and 3-3 indicates a sequence number of a data packet. FIGS. 3-1 to 3-3 exemplarily show the case where 8 data packets are transmitted in two frequency bands (for example, band 1 and band 2). FIG. 3-1 is a schematic diagram of arrangement indication information carried in each of the data packets transmitted in two frequency bands. FIG. 3-2 is a schematic diagram of assigning sequence numbers to data packets transmitted in different frequency bands. FIG. 3-3 is a schematic diagram of sorting in the case where arrangement indication information includes continuity indication information and frequency band indication information.

As shown in FIG. 3-1, arrangement indication information (in the form of tag) is added to 8 data packets in terms of a sending order and the continuity of the 8 data packets. The original order of the 8 data packets is [1][2][3][4][5][6][7][8]. Data packets [1][2][4][7] are transmitted in band 1. Data packets [3][5][6][8] are transmitted in band 2. Frequency band indication information (identified by Tag1 by way of example) occupies 1 bit. Data packet continuity indication information (identified by Tag2 by way of example) occupies 1 bit. The frequency band indication information and the data packet continuity indication information constitute the arrangement indication information (Tag). The values of the frequency band indication information (tag1) may be 0 and 1. The value 0 of Tag1 may indicate that the previous data packet of current data packet is transmitted in band 1. The value 1 of Tag1 may indicate that the previous data packet of current data packet is transmitted in band 2. The values of the data packet continuity indication information (Tag2) may be 0 and 1. The value 0 of Tag2 may indicate that the current packet and the previous data packet are transmitted continuously in the same frequency band. The value 1 of Tag2 may indicate that the current packet and the previous data packet are transmitted discontinuously.

Data packet [1] is the first sent data packet. Arrangement indication information (Tag)=0 1 is added to data packet [1]. Tag1=0 may indicate that data packet [1] is transmitted in band 1. Tag2=1 may indicate that data packet [1] and the previous data packet are transmitted discontinuously.

Arrangement indication information (Tag)=0 0 is added to data packet [2]. Tag1=0 may indicate that the previous data packet of data packet [2] is transmitted in band 1. Tag2=0 may indicate that data packet [2] and data packet [1] are transmitted continuously in the same frequency band.

Arrangement indication information (Tag)=0 1 is added to data packet [3]. Tag1=0 may indicate that the previous data packet of data packet [3] is transmitted in band 1. Tag2=1 may indicate that data packet [3] and data packet [2] are not transmitted in the same frequency band, that is, not transmitted continuously. Similarly, arrangement indication information is added to all the remaining data packets.

FIG. 3-2 shows that when a sending side sends wireless data packets in two frequency bands, the sending side assigns sequence numbers to data packets in respective frequency bands separately. In band 1, sequence numbers 1, 2, 3, and 4 are assigned to data packets [1], [2], [4], and [7] respectively. In band 2, sequence numbers 1, 2, 3, and 4 are assigned to data packets [3], [5], [6], and [8] respectively.

FIG. 3-3 shows that after receiving data packets, a receiving device sorts and combines the multiple data packets. In FIG. 3-3, the process of sorting and combining the multiple data packets is described below.

First, the arrangement indication information (Tag) of data packets having sequence numbers (SNs) of 1 in the two frequency bands is acquired. As shown in FIG. 3-2, Tag1 of the data packet having an SN of 1 in band 1 is {0}; Tag1 of the data packet having an SN of 1 in band 2 is not {1}, but {0}. That is, the frequency band for the previous data packet of the data packet having an SN of 1 in band 2 is identified by {0}. It can be seen that the data packet having an SN of 1 in band 1 is before the data packet having an SN of 1 in band 2. Therefore, it is determined that the data packet having an SN of 1 in band 1 is the first sent data packet [1].

Then, Tag2 of the next data packet (that is, the data packet having an SN of 2) is searched for in the frequency band in which data packet [1] is located (that is, band 1). Tag2 of this data packet is 0, indicating that this data packet and data packet [1] are transmitted continuously in the same frequency band. Therefore, the data packet having an SN of 2 in band 1 is the second data packet sent by the sending device. This data packet is identified by data packet [2]. Then, Tag2 of the next data packet (that is, the data packet having an SN of 3 in band 1) is searched for in the same frequency band. If tag2 of this data packet is 1 (indicating that this data packet and the previous data packet are transmitted discontinuously), switching from band 1 to band 2, Tag1 of an unsorted data packet having the minimum SN in band 2 (that is, the data packet having an SN of 1 in band 2) is searched for. Tag1 of this data packet is 0, indicating that the previous data packet of this data packet is transmitted in band 1 and that the data packet having an SN of 1 in band 2 is unsorted and has the smallest SN in band 2. Therefore, this data packet is transmitted between two discontinuous data packets (that is, the data packet having an SN of 2 and the data packet having an SN of 3) in band 1. This data packet is identified by data packet [3].

Similarly, sorting of all the data packets is performed.

The example of FIGS. 3-1 to 3-3 show the process of sorting multiple data packets according to the sequence number, the data packet continuity indication information, and the frequency band indication information of each of the multiple data packets from the first sent data packet. In the example of FIGS. 3-1 to 3-3, in response to the data packet continuity indication information carried in a to-be-sorted target data packet indicating discontinuous data packets, in all unsorted data packets having the minimum sequence numbers in frequency bands other than the frequency band in which the to-be-sorted target data packet is located, only one data packet satisfies the following condition: the frequency band indication information of this data packet indicates an identifier that is the same as the identifier of the frequency band in which the previous data packet in the current sort is located.

However, in embodiments of the present disclosure, in response to the data packet continuity indication information carried in a to-be-sorted target data packet indicating discontinuous data packets, in all unsorted data packets having the minimum sequence numbers in frequency bands other than the frequency band in which the to-be-sorted target data packet is located, one data packet may satisfy the preceding condition, or multiple data packets may satisfy the preceding condition. For this reason, another embodiment of the present disclosure provides a solution. The following describes the details of this solution. In response to the data packet continuity indication information carried in the to-be-sorted target data packet indicating that the to-be-sorted target data packet and the previous data packet of the to-be-sorted target data packet are transmitted discontinuously, one implementation manner of acquiring a target specified data packet is to acquire a specified data packet from all unsorted data packets having the minimum sequence numbers in frequency bands other than the frequency band in which the to-be-sorted target data packet is located. The specified data packet is a data packet whose frequency band indication information indicates an identifier that is the same as the identifier of the frequency band in which the previous data packet in the current sort is located. In response to one specified data packet being acquired, the one specified data packet is determined to be the target specified data packet; and in response to multiple specified data packets being acquired, one specified data packet is determined from the multiple specified data packets to be the target specified data packet.

In one embodiment, the process of determining one specified data packet from the multiple specified data packets to be the target specified data packet is described below.

First, one specified data packet (identified by a j-th data packet) is determined from the multiple specified data packets to be a test data packet and used as a to-be-sorted target data packet, where j is an integer greater than or equal to 2. The j-th data packet is after the first sent data packet. Data packets before the j-th data packet and in the frequency band in which the j-th data packet is located have all been sorted. At initial, any one of the multiple specified data packets is selected as the test data packet.

Then, it is determined whether the data packet continuity indication information carried in the to-be-sorted target data packet indicates that the to-be-sorted target data packet and the previous data packet of the to-be-sorted target data packet are transmitted continuously.

In response to the data packet continuity indication information carried in the to-be-sorted target data packet indicating that the to-be-sorted target data packet and the previous data packet of the to-be-sorted target data packet are transmitted continuously, a (j+1)-th data packet is used as a new to-be-sorted target data packet and the sorting continues. The (j+1)-th data packet is the next data packet in the frequency band in which the j-th data packet is located.

In response to the data packet continuity indication information carried in the to-be-sorted target data packet indicating that the to-be-sorted target data packet and the previous data packet of the to-be-sorted target data packet are transmitted discontinuously, an unsorted data packet having the minimum sequence number in each frequency band other than the frequency band in which the to-be-sorted target data packet is located is acquired, and it is determined whether a specific data packet is present in all unsorted data packets having the minimum sequence numbers in frequency bands other than the frequency band in which the to-be-sorted target data packet is located, where the specific data packet is a data packet whose frequency band indication information indicates an identifier that is the same as the identifier of the frequency band in which the current to-be-sorted target data packet is located.

In response to the specific data packet being not present, the current test data packet is determined not able to serve as the target specified data packet and another data packet is determined from the multiple specified data packets to be a test data packet.

In response to the specific data packet being present, the next data packet in the frequency band in which the specific data packet is located is determined to be a new to-be-sorted target data packet and the sorting continues; and in response to the specific data packet being always present throughout a sorting process, the current test data packet is determined to be the target specified data packet.

In the preceding manner, it is possible to solve the problem in sorting data packets in the case where multiple specified data packets are present in all unsorted data packets having the minimum sequence numbers in frequency bands other than the frequency band in which a to-be-sorted target data packet is located when the data packet continuity indication information carried in the to-be-sorted target data packet indicates discontinuous data packets. This manner is simple and easy to implement, thus ensuring high-efficiency operation and high-accuracy sorting. Moreover, with the hypothesis verification, specified data packets not satisfying the condition can be removed effectively, and the target specified data packet can be found conveniently.

Figures 1, 4:
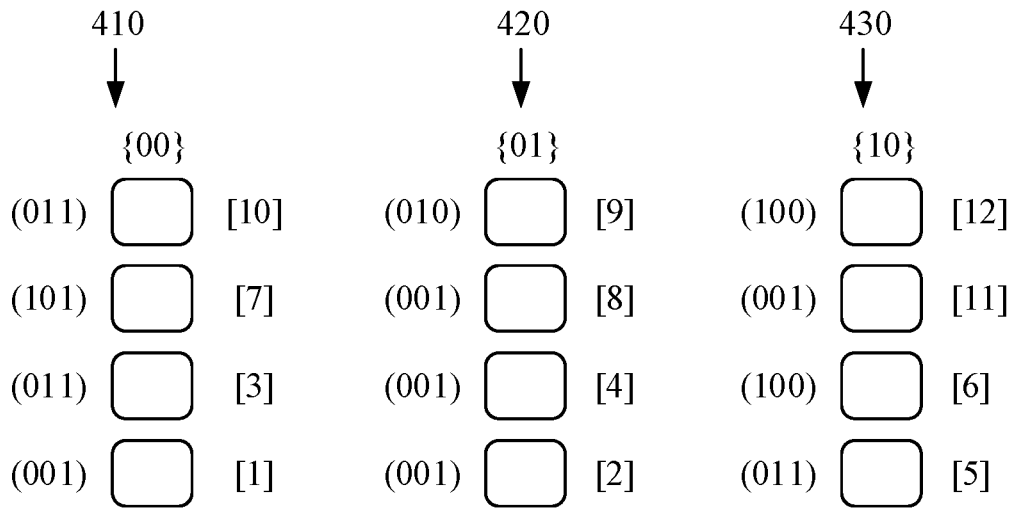
Figures 2, 4:
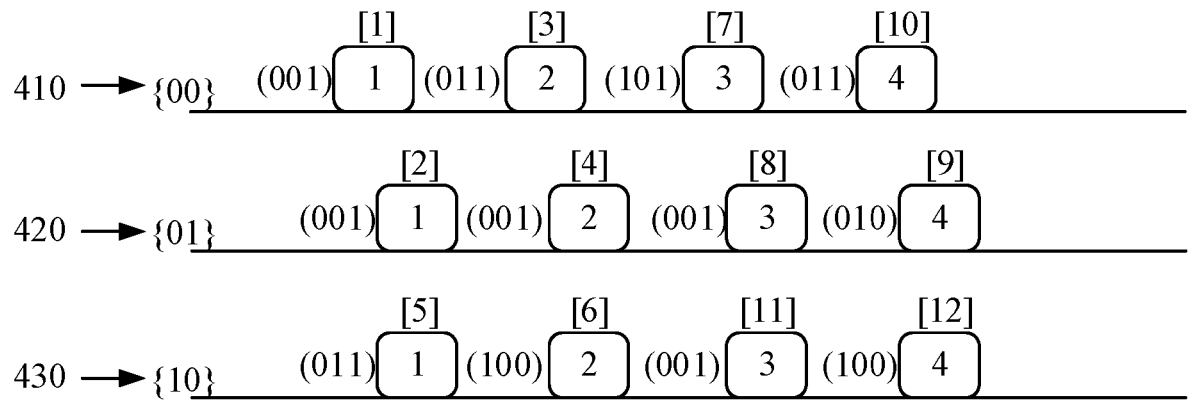
Figures 3, 4:
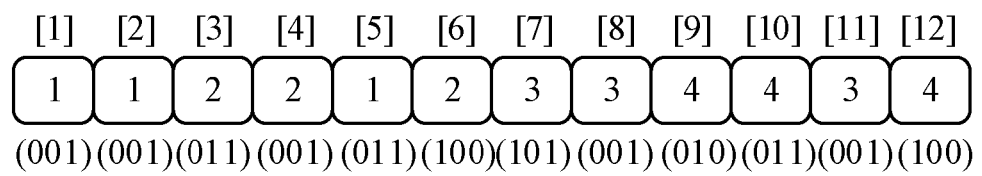

A detailed description is given hereinafter in conjunction with the drawings. Referring to FIGS. 4-1 to 4-3, the reference numeral 410 indicates band 1, the reference numeral 420 indicates band 2, and the reference numeral 430 indicates band 3. FIGS. 4-1 to 4-3 exemplarily show the case where 12 data packets are transmitted in three frequency bands (for example, band 1, band 2, and band 3). Band 1, band 2, and band 3 are identified by {00}, {01}, and {10} respectively. FIG. 4-1 is a schematic diagram of arrangement indication information carried in each of the data packets transmitted in three frequency bands. FIG. 4-2 is a schematic diagram of assigning sequence numbers to data packets transmitted in different frequency bands. FIG. 4-3 is a schematic diagram of sorting in the case where arrangement indication information includes continuity indication information and frequency band indication information.

As shown in FIG. 4-1, arrangement indication information (in the form of tag) is added to 12 data packets in terms of the sending order and the continuity of the 12 data packets. The original order of the 12 data packets is [1][2][3][4][5][6][7][8][9][10][11][12]. Data packets [1][3][7][10] are transmitted in band 1. Data packets [2][4][8][9] are transmitted in band 2. Data packets [5][6][11][12] are transmitted in band 3. Frequency band indication information (identified by Tag1 by way of example) occupies 2 bits. Data packet continuity indication information (identified by Tag2 by way of example) occupies 1 bit. The frequency band indication information and the data packet continuity indication information constitute the arrangement indication information (Tag). The values of the frequency band indication information (Tag1) may be 00, 01, and 10. The value 00 of Tag1 may indicate that the previous data packet of current data packet is transmitted in band 1. The value 01 of Tag1 may indicate that the previous data packet of current data packet is transmitted in band 2. The value 10 of Tag1 may indicate that the previous data packet of current data packet is transmitted in band 3. The values of the data packet continuity indication information (Tag2) may be 0 and 1. The value 0 of Tag2 may indicate that the current packet and the previous data packet are transmitted continuously in the same frequency band. The value 1 of Tag2 may indicate that the current packet and the previous data packet are transmitted discontinuously.

Data packet [1] is the first sent data packet. Arrangement indication information (Tag)=0 1 is added to data packet [1]. Tag1=0 may indicate that data packet [1] is transmitted in band 1. Tag2=1 may indicate that data packet [1] and the previous data packet are transmitted discontinuously.

Arrangement indication information (Tag)=0 0 is added to data packet [2]. Tag1=0 may indicate that the previous data packet of data packet [2] is transmitted in band 1. Tag2=0 may indicate that data packet [2] and data packet [1] are transmitted continuously in the same frequency band.

Arrangement indication information (Tag)=0 1 is added to data packet [3]. Tag1=0 may indicate that the previous data packet of data packet [3] is transmitted in band 1. Tag2=1 may indicate that data packet [3] and data packet [2] are not transmitted in the same frequency band, that is, not transmitted continuously. Similarly, arrangement indication information is added to all the remaining data packets.

FIG. 4-2 shows that when a sending side sends wireless data packets in three frequency bands, the sending side assigns sequence numbers to data packets in respective frequency bands separately. In band 1, sequence numbers 1, 2, 3, and 4 are assigned to data packets [1], [3], [7], and [10] respectively. In band 2, sequence numbers 1, 2, 3, and 4 are assigned to data packets [2], [4], [8], and [9] respectively. In band 3, sequence numbers 1, 2, 3, and 4 are assigned to data packets [5], [6], [11], and [12] respectively.

FIG. 4-3 shows that after receiving data packets, a receiving device sorts and combines the data packets. In FIG. 4-3, the process of sorting and combining the data packets is described below.

First, the arrangement indication information (Tag) of data packets each having a sequence number (SN) of 1 in the three frequency bands is acquired. As shown in FIG. 4-2, Tag1 of the data packet having an SN of 1 in band 1 is {00}; Tag1 of the data packet having an SN of 1 in band 2 is not {01}, but {00}; Tag1 of the data packet having an SN of 1 in band 3 is not {10}, but {01}. It can be seen that the identifier {00} indicated by the frequency band indication information of the data packet having an SN of 1 in band 1 is the same as the identifier {00} of the frequency band in which the data packet having an SN of 1 in band 1 is located. Therefore, it is determined that the data packet having an SN of 1 in band 1 is the first sent data packet [1].

Then, Tag2 of the next data packet (that is, the data packet having an SN of 2) is searched for in the frequency band in which data packet [1] is located (that is, band 1). Tag2 of this data packet is 1, indicating that the data packet having an SN of 1 and the data packet having an SN of 2 in band 1 are transmitted discontinuously. In this case, other frequency bands (that is, band 2 and band 3) are searched. It is found that Tag1 of the unsorted data packet having the minimum SN (that is, the data packet having an SN of 1) in band 2 is 00, and Tag1 of the unsorted data packet having the minimum SN (that is, the data packet having an SN of 1) in band 3 is not 00, but 01. That is, the frequency band in which the previous data packet of the data packet having an SN of 1 in band 2 is identified by 00, and the frequency band in which the previous data packet of the data packet having an SN of 1 in band 3 is identified by 01. Therefore, it is determined that the data packet having an SN of 1 in band 2 is data packet [2].

Next, Tag2 of the next data packet (that is, the data packet having an SN of 2) in the frequency band in which data packet [2] is located (that is, band 2) is checked. Tag2 of this packet is 1. In this case, other frequency bands (that is, band 1 and band 3) are searched for Tag1 of the unsorted data packet having the minimum SN (that is, the data packet having an SN of 2) in band 1 and for Tag1 of the unsorted data packet having the minimum SN (that is, the data packet having an SN of 1) in band 3. In this case, Tag1 of the data packet having an SN of 2 in band 1 and Tag1 of the data packet having an SN of 1 in band 3 are both 01. Therefore, the operations below are performed.

Assuming that the unsorted data packet having the minimum SN (that is, the data packet having an SN of 1) in band 3 (having an SN of {10}) is data packet [3], the frequency band in which data packet [3] is located is searched for the next data packet, that is, the data packet having an SN of 2. Since Tag2 of the data packet having an SN of 2 in band 3 is 0, the data packet having an SN of 2 in band 3 is data packet [4]. Then, band 3 is further searched for the next data packet, that is, the data packet having an SN of 3. Since Tag2 of the data packet having an SN of 3 in band 3 is 1, band 1 and band 2 are each searched for an unsorted data packet having the minimum SN. An unsorted data packet having the minimum SN in band 1 is the data packet having an SN of 2. An unsorted data packet having the minimum SN in band 2 is the data packet having an SN of 2. Tag1 of the unsorted data packet having the minimum SN (that is, the data packet having an SN of 2) in band 1 is not 10, but 01. Tag1 of the unsorted data packet having the minimum SN (that is, the data packet having an SN of 2) in band 2 is not 10, but 00. It can be seen that the previous data packet of the unsorted data packet having the minimum SN (that is, the data packet having an SN of 2) in band 1 is in band 2, and the previous data packet of the unsorted data packet having the minimum SN (that is, the data packet having an SN of 2) in band 2 is in band 1. That is, neither is in band 3. It can be seen that the assumption is false, so the unsorted data packet having the minimum SN (that is, the data packet having an SN of 1) in band 3 is not data packet [3].

Assuming that the unsorted data packet having the minimum SN (that is, the data packet having an SN of 2) in band 1 (having an SN of {00}) is data packet [3], the frequency band in which data packet [3] is located is searched for the next data packet, that is, the data packet having an SN of 3. Since Tag2 of the data packet having an SN of 3 in band 1 is 1, band 2 and band 3 are each searched for an unsorted data packet having the minimum SN. An unsorted data packet having the minimum SN in band 2 is the data packet having an SN of 2. An unsorted data packet having the minimum SN in band 3 is the data packet having an SN of 1. Tag1 of the unsorted data packet having the minimum SN (that is, the data packet having an SN of 2) in band 2 is 00. Tag1 of the unsorted data packet having the minimum SN (that is, the data packet having an SN of 1) in band 3 is not 00, but 01. It can be seen that the previous data packet of the unsorted data packet having the minimum SN (that is, the data packet having an SN of 2) in band 2 is in band 1, and the previous data packet of the unsorted data packet having the minimum SN (that is, the data packet having an SN of 1) in band 3 is in band 2. Therefore, it can be determined that the data packet having an SN of 2 in band 2 is data packet [3].

Similarly, sorting of all the data packets is performed.

Figure 5:
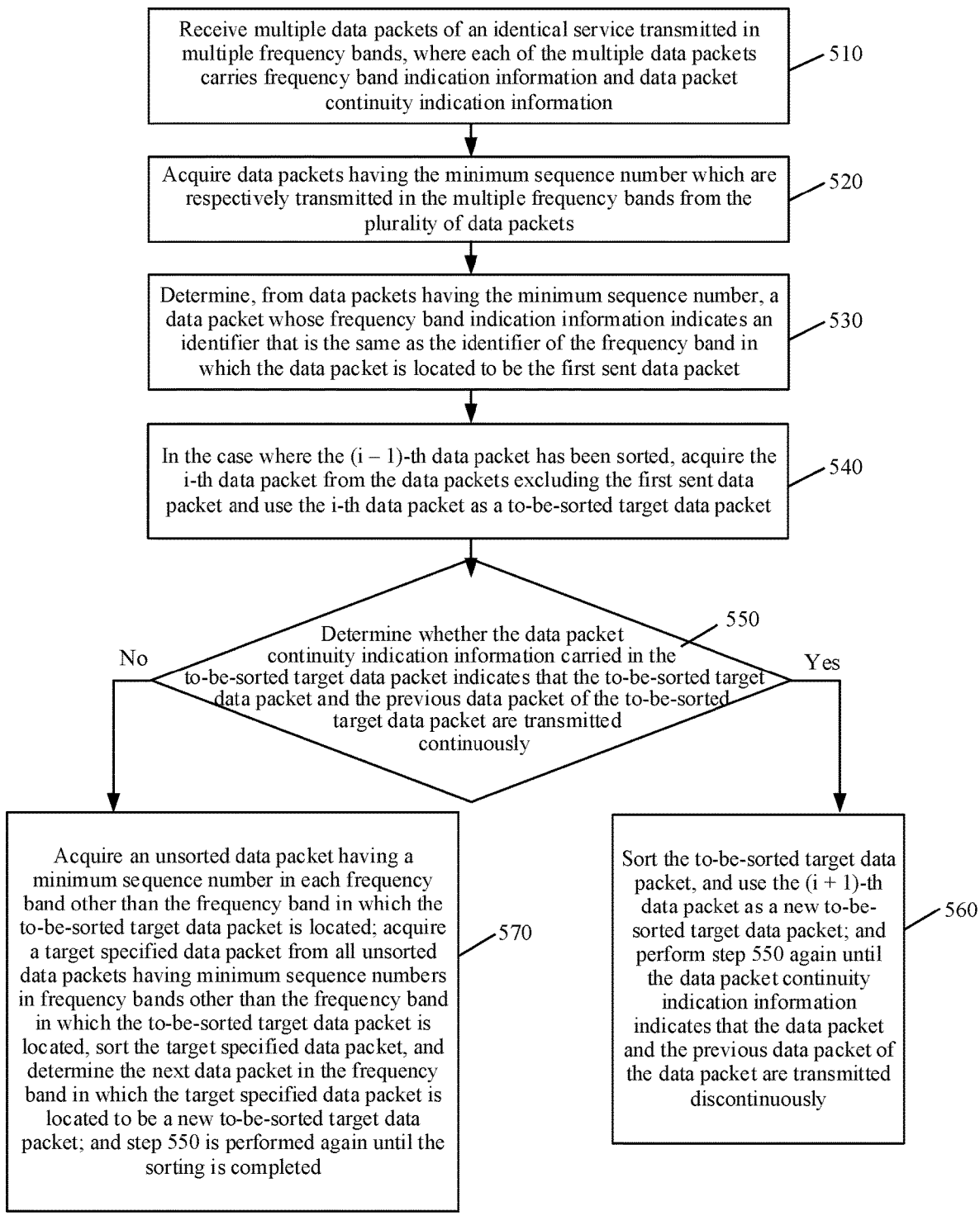
FIG. 5 is a flowchart of another method for processing data packets according to an embodiment of the present disclosure.

FIG. 5 is a flowchart of a method for processing data packets according to an embodiment of the present disclosure. Referring to FIG. 5, the method for processing data packets according to the embodiment of the present disclosure may be performed by various receiving devices and may include the steps below.

In step 510, multiple data packets of an identical service transmitted in multiple frequency bands are received, where each of the multiple data packets carries frequency band indication information (Tag1 in each preceding example) and data packet continuity indication information (Tag2 in each preceding example).

The frequency band indication information indicates an identifier of a frequency band in which a previous data packet of a data packet carrying the frequency band indication information is located. The data packet continuity indication information indicates whether a data packet carrying the data packet continuity indication information and a previous data packet of the data packet are transmitted continuously.

In step 520, data packets having a minimum sequence number (for example, a sequence number of 1) transmitted in respective frequency bands are acquired from the multiple data packets.

In step 530, a data packet whose frequency band indication information indicates an identifier that is the same as an identifier of a frequency band in which the data packet is located is determined from the data packets having the minimum sequence number to be a first sent data packet.

In step 540, in the case where an (i−1)-th data packet has been sorted, an i-th data packet is acquired from the multiple data packets excluding the first sent data packet and used as a to-be-sorted target data packet, here i is an integer greater than or equal to 2. The i-th data packet is an unsorted data packet after the first sent data packet. Data packets before the i-th data packet and in the frequency band in which the i-th data packet is located have all been sorted.

In step 550, it is determined whether the data packet continuity indication information carried in the to-be-sorted target data packet indicates that the to-be-sorted target data packet and a previous data packet of the to-be-sorted target data packet are transmitted continuously.

In step 560, in response to the data packet continuity indication information carried in the to-be-sorted target data packet indicating that the to-be-sorted target data packet and the previous data packet of the to-be-sorted target data packet are transmitted continuously, the to-be-sorted target data packet is sorted, and an (i+1)-th data packet is used as a new to-be-sorted target data packet to be sorted next time. The (i+1)-th data packet is the next data packet in the frequency band in which the i-th data packet is located.

Here, after the (i+1)-th data packet is used as the new to-be-sorted target data packet, step 550 may be performed again until the data packet continuity indication information indicates that a data packet and a previous data packet of the data packet are transmitted discontinuously.

In step 570, in response to the data packet continuity indication information carried in the to-be-sorted target data packet indicating that the to-be-sorted target data packet and the previous data packet of the to-be-sorted target data packet are transmitted discontinuously, an unsorted data packet having a minimum sequence number in each frequency band other than the frequency band in which the to-be-sorted target data packet is located is acquired; and a target specified data packet is acquired from all unsorted data packets having minimum sequence numbers in frequency bands other than the frequency band in which the to-be-sorted target data packet is located, the target specified data packet is sorted, and the next data packet in the frequency band in which the target specified data packet is located is determined to be a new to-be-sorted target data packet which is to be sorted next time. The identifier indicated by the frequency band indication information of the target specified data packet is the same as the identifier of the frequency band in which the last data packet that has been sorted is located.

For an example of this procedure, see the preceding description of FIGS. 3-1 to 3-3.

After the next data packet in the frequency band in which the target specified data packet is located is determined to be a new to-be-sorted target data packet, step 550 may be performed again until the sorting is completed.

In the process of acquiring the target specified data packet, if multiple data packets each of whose frequency band indication information indicates an identifier that is the same as the identifier of the frequency band in which the last data packet that has been sorted is located are present, it is needed to determine one data packet from the multiple data packets to be the target specified data packet. The following describes this process in detail.

First, a data packet whose frequency band indication information indicates an identifier that is the same as the identifier of the frequency band in which the last data packet that has been sorted is located is determined to be a specified data packet. One specified data packet is selected from multiple specified data packets to be a test data packet (identified by a j-th data packet) and the j-th data packet is used as a to-be-sorted target data packet. Here, j is an integer greater than or equal to 2. The j-th data packet is an unsorted data packet after the first sent data packet. Data packets before the j-th data packet and in the frequency band in which the j-th data packet is located have all been sorted. At initial, any one of the multiple specified data packets is selected as the j-th data packet.

Then, it is determined whether the data packet continuity indication information carried in the to-be-sorted target data packet indicates that the to-be-sorted target data packet and a previous data packet of the to-be-sorted target data packet are transmitted continuously.

In response to the data packet continuity indication information carried in the to-be-sorted target data packet indicating that the to-be-sorted target data packet and the previous data packet of the to-be-sorted target data packet are transmitted continuously, a (j+1)-th data packet is used as a new to-be-sorted target data packet which is to be sorted next time. The (j+1)-th data packet is the next data packet in the frequency band in which the j-th data packet is located.

In response to the data packet continuity indication information carried in the to-be-sorted target data packet indicating that the to-be-sorted target data packet and the previous data packet of the to-be-sorted target data packet are transmitted discontinuously, an unsorted data packet having a minimum sequence number in each frequency band other than the frequency band in which the to-be-sorted target data packet is located is acquired, and it is determined whether a specific data packet is present in all unsorted data packets having minimum sequence numbers in frequency bands other than the frequency band in which the to-be-sorted target data packet is located, where the specific data packet is a data packet whose frequency band indication information indicates an identifier that is the same as the identifier of the frequency band in which the current to-be-sorted target data packet is located.

In response to the specific data packet being not present, the current test data packet (that is, the j-th data packet) is determined not to be the target specified data packet and another data packet is selected from the multiple specified data packets to be a test data packet.

In response to the specific data packet being present, the next data packet in the frequency band in which the specific data packet is located is determined to be a new to-be-sorted target data packet; and in response to the specific data packet being always present throughout a sorting process, the current test data packet (that is, the j-th data packet) is determined to be the target specified data packet.

For an example of this process, see the preceding description of FIGS. 4-1 to 4-3.

In the method for processing data packets according to the embodiment of the present disclosure, after multiple data packets transmitted in multiple frequency bands are acquired, since each of the multiple data packets carries the arrangement indication information, the multiple data packets can be sorted based on the arrangement indication information carried in each of the multiple data packets. Therefore, it is able to solve the problem that data packets cannot be sorted since processes of assigning sequence numbers to data packets in respective frequency bands are separate from each other during multi-band transmission, thereby ensuring normal sorting of the multiple data packets and thus obtaining target data for service. Moreover, the operation of sorting the multiple data packets based on the sequence number, the data packet continuity indication information, and the frequency band indication information of each of the multiple data packets ensures high-efficiency operation and high-accuracy sorting.

Figure 6:
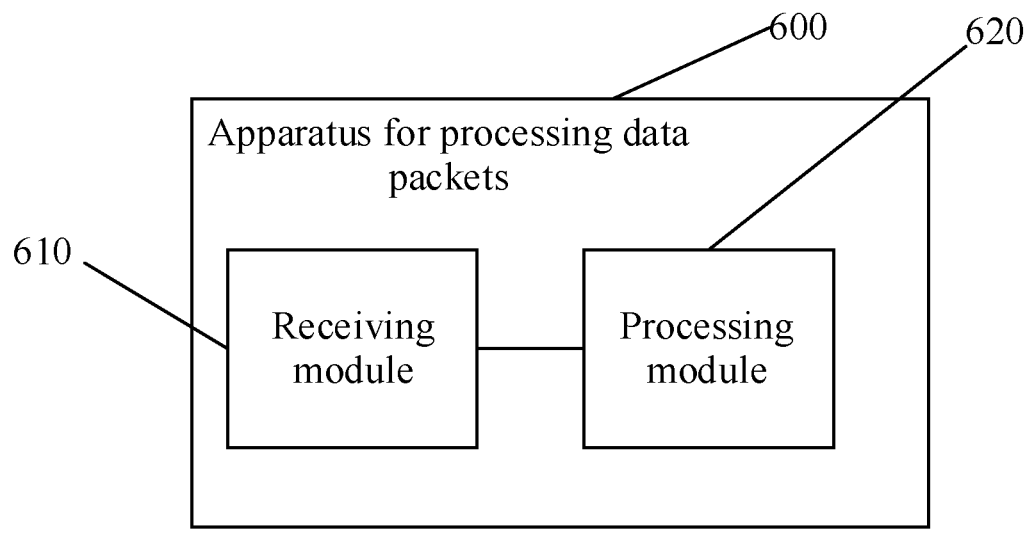
FIG. 6 is a block diagram of an apparatus for processing data packets according to an embodiment of the present disclosure.

FIG. 6 is a block diagram of an apparatus for processing data packets according to an embodiment of the present disclosure. Referring to FIG. 6, the apparatus 600 for processing data packets according to the embodiment of the present disclosure may include a receiving module 610 and a processing module 620.

The receiving module 610 is configured to receive multiple data packets for an identical service transmitted in multiple frequency bands, where each of the multiple data packets carries arrangement indication information.

The processing module 620 is configured to perform a sorting process on the multiple data packets based on the arrangement indication information carried in each of the data packets received by the receiving module 610.

The multiple data packets after the sorting process can form a data packet sequence. Target data can be obtained from the data packet sequence.

In the embodiment of the present disclosure, after the apparatus for processing data packets acquires the multiple data packets transmitted in the multiple frequency bands, since each of the multiple data packets carries the arrangement indication information, the apparatus for processing data packets can sort the multiple data packets based on the arrangement indication information carried in each of the multiple data packets. Therefore, it is able to solve the problem that data packets cannot be sorted since processes of assigning sequence numbers to data packets in respective frequency bands are separate from each other during multi-band transmission, thereby ensuring normal sorting of the multiple data packets and thus obtaining target data for service.

In an embodiment of the present disclosure, the arrangement indication information includes a serial number for uniquely identifying a data packet; the processing module 620 may be configured to sort the multiple data packets in order of sizes of the serial numbers respectively carried in the multiple data packets.

In an embodiment of the present disclosure, the arrangement indication information includes data packet continuity indication information and frequency band indication information. In a process of sorting the multiple data packets based on the arrangement indication information, the processing module 620 may be configured to: acquire a first sent data packet from the multiple data packets; and then sort the multiple data packets starting from the next data packet of the first sent data packet based on the data packet continuity indication information and the frequency band indication information carried in each of the multiple data packets.

In an embodiment of the present disclosure, the packets each have a sequence number, the data packet continuity indication information indicates whether a data packet carrying the data packet continuity indication information and a previous data packet of the data packet are transmitted continuously, and the frequency band indication information indicates an identifier of a frequency band in which a previous data packet of a data packet carrying the frequency band indication information is located. In a process of acquiring the first sent data packet, the processing module 620 may be configured to determine the first sent data packet based on the sequence number and the frequency band indication information of each of the multiple data packets. In sorting the multiple data packets based on the data packet continuity indication information and the frequency band indication information carried in each of the multiple data packets, the processing module 620 may be configured to sort the multiple data packets based on the sequence number, the data packet continuity indication information, and the frequency band indication information of each of the multiple data packets.

In an embodiment of the present disclosure, the processing module 620 may be configured to determine the first sent data packet based on the sequence number and the frequency band indication information of each of the multiple data packets by: acquiring data packets having a minimum sequence number (for example, sequence number=1) transmitted in respective frequency bands from the multiple data packets and determining, from the acquired data packets having the minimum sequence number, a data packet whose frequency band indication information indicates an identifier that is the same as an identifier of a frequency band in which the data packet is located to be the first sent data packet.

In an embodiment of the present disclosure, the processing module 620 is configured to sort the multiple data packets based on the sequence number, the data packet continuity indication information, and the frequency band indication information of each of the multiple data packets by performing the following operations. First, an i-th data packet is acquired from the multiple data packets and used as a to-be-sorted target data packet, where i is an integer greater than or equal to 2, the i-th data packet is an unsorted data packet after the first sent data packet, data packets before the i-th data packet and in the frequency band in which the i-th data packet is located have all been sorted. Then, it is determined whether the data packet continuity indication information carried in the to-be-sorted target data packet indicates that the to-be-sorted target data packet and a previous data packet of the to-be-sorted target data packet are transmitted continuously. In response to the data packet continuity indication information carried in the to-be-sorted target data packet indicating that the to-be-sorted target data packet and the previous data packet of the to-be-sorted target data packet are transmitted continuously, the to-be-sorted target data packet is sorted, and an (i+1)-th data packet is used as a new to-be-sorted target data packet which is to be sorted subsequently, where the (i+1)-th data packet is the next data packet in the frequency band in which the i-th data packet is located. In response to the data packet continuity indication information carried in the to-be-sorted target data packet indicating that the to-be-sorted target data packet and the previous data packet of the to-be-sorted target data packet are transmitted discontinuously, an unsorted data packet having a minimum sequence number in each frequency band other than the frequency band in which the to-be-sorted target data packet is located is acquired; and a target specified data packet is acquired from all unsorted data packets having minimum sequence numbers in frequency bands other than the frequency band in which the to-be-sorted target data packet is located, the target specified data packet is sorted, and the next data packet in the frequency band in which the target specified data packet is located is determined to be a new to-be-sorted target data packet which is to be sorted next time. The identifier indicated by the frequency band indication information of the target specified data packet is the same as the identifier of the frequency band in which the last data packet that has been sorted is located.

In an embodiment of the present disclosure, the processing module 620 may be configured to acquire the target specified data packet from all unsorted data packets having minimum sequence numbers in frequency bands other than the frequency band in which the to-be-sorted target data packet is located by: acquiring a specified data packet which is present in all unsorted data packets having the minimum sequence numbers in the frequency bands other than the frequency band in which the to-be-sorted target data packet is located, where the specified data packet is a data packet whose frequency band indication information indicates an identifier that is the same as the identifier of the frequency band in which the last data packet that has been sorted is located; in response to one specified data packet being acquired, determining the one specified data packet to be the target specified data packet; and in response to multiple specified data packets being acquired, determining one specified data packet from the multiple specified data packets to serve as the target specified data packet.

In response to multiple specified data packets being acquired, the processing module 620 may be configured to perform the following operations. First, one specified data packet is selected from the multiple specified data packets to serve as a test data packet (identified by a j-th data packet) and the j-th data packet is used as a to-be-sorted target data packet, where j is an integer greater than or equal to 2, the j-th data packet is an unsorted data packet after the first sent data packet, data packets before the j-th data packet and in the frequency band in which the j-th data packet is located have all been sorted, and at initial, any one of the multiple specified data packets is selected as the j-th data packet. Then, it is determined whether the data packet continuity indication information carried in the to-be-sorted target data packet indicates that the to-be-sorted target data packet and a previous data packet of the to-be-sorted target data packet are transmitted continuously. In response to the data packet continuity indication information carried in the to-be-sorted target data packet indicating that the to-be-sorted target data packet and the previous data packet of the to-be-sorted target data packet are transmitted continuously, a (j+1)-th data packet is used as a new to-be-sorted target data packet which is to be sorted next time, where the (j+1)-th data packet is the next data packet in the frequency band in which the j-th data packet is located. In response to the data packet continuity indication information carried in the to-be-sorted target data packet indicating that the to-be-sorted target data packet and the previous data packet of the to-be-sorted target data packet are transmitted discontinuously, an unsorted data packet having a minimum sequence number in each frequency band other than the frequency band in which the to-be-sorted target data packet is located is acquired, and it is determined whether a specific data packet is present in all unsorted data packets having minimum sequence numbers in frequency bands other than the frequency band in which the to-be-sorted target data packet is located. The specific data packet is a data packet whose frequency band indication information indicates an identifier that is the same as the identifier of the frequency band in which the current to-be-sorted target data packet is located. In response to the specific data packet being not present, the current test data packet is determined not able to serve as the target specified data packet and another data packet is determined from the multiple specified data packets to serve as test data packet. In response to the specific data packet being present, the next data packet in the frequency band in which the specific data packet is located is determined to be a new to-be-sorted target data packet which is to be sorted next time; and in response to the specific data packet being always present throughout a sorting process, the current test data packet is determined to be the target specified data packet.

Figure 7:
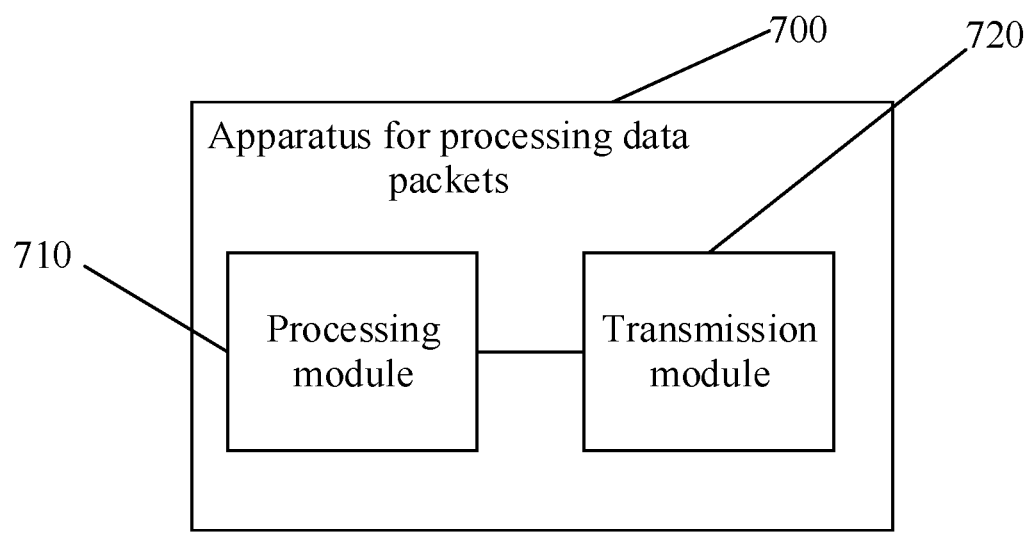
FIG. 7 is a block diagram of another apparatus for processing data packets according to an embodiment of the present disclosure.

FIG. 7 is a block diagram of an apparatus for processing data packets according to an embodiment of the present disclosure. Referring to FIG. 7, the apparatus 700 for processing data packets according to the embodiment of the present disclosure may include a processing module 710 and a transmission module 720.

The processing module 710 is configured to cause each of multiple data packets of an identical service to carry arrangement indication information.

The transmission module 720 is configured to transmit the multiple data packets in multiple frequency bands, where each of the multiple data packets carries the arrangement indication information.

In the embodiment of the present disclosure, the apparatus for processing data packets may cause each to-be-sent data packet to carry the arrangement indication information and send the data packets containing the arrangement indication information in the multiple frequency bands. In this manner, after a receiving device acquires the multiple data packets transmitted in the multiple frequency bands, since each of the multiple data packets carries the arrangement indication information, the receiving device can sort the multiple data packets by using the arrangement indication information carried in each of the multiple data packets. Therefore, it is able to solve the problem that data packets cannot be sorted since processes of assigning sequence numbers to data packets in respective frequency bands are separate from each other during multi-band transmission, thereby ensuring normal sorting of the multiple data packets and thus obtaining target data for service.

In an embodiment of the present disclosure, the arrangement indication information includes a serial number for uniquely identifying a data packet. The serial number is determined according to a sending order of the data packets.

In another embodiment of the present disclosure, the arrangement indication information includes frequency band indication information and data packet continuity indication information. The frequency band indication information indicates an identifier of a frequency band in which a previous data packet of a data packet carrying the frequency band indication information is located. The data packet continuity indication information indicates whether a data packet carrying the data packet continuity indication information and a previous data packet of the data packet are transmitted continuously in the same frequency band.

Figure 8:
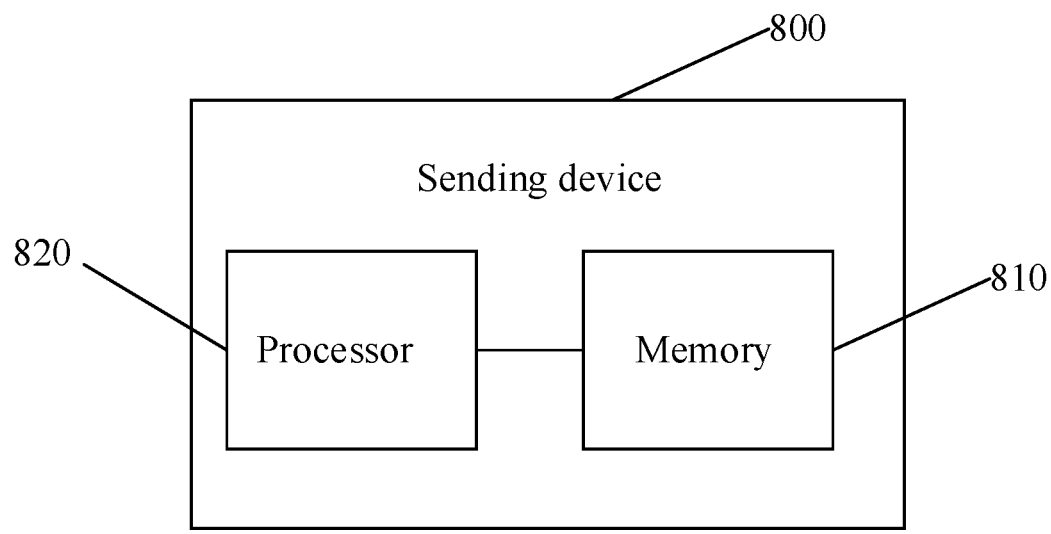
FIG. 8 is a schematic diagram of a sending device according to an embodiment of the present disclosure.

FIG. 8 is a schematic diagram of a sending device according to an embodiment of the present disclosure. Referring to FIG. 8, the sending device 800 according to the embodiment of the present disclosure may include a memory 810 and a processor 820. The memory 810 can store a computer program. When the computer program is executed by the processor 820, steps in any preceding method for processing data packets can be performed. For example, when the computer program is executed by the processor 820, the following operations are performed: causing each of multiple data packets of an identical service to carry arrangement indication information; and transmitting the multiple data packets in multiple frequency bands, where each of the multiple data packets carries the arrangement indication information.

In the embodiment of the present disclosure, the sending device may cause each to-be-sent data packet to carry the arrangement indication information and send the data packets containing the arrangement indication information in multiple frequency bands. In this manner, after a receiving device acquires the multiple data packets transmitted in the multiple frequency bands, since each of the multiple data packets carries the arrangement indication information, the receiving device can sort the multiple data packets by using the arrangement indication information carried in the multiple data packets. Therefore, it is able to solve the problem that data packets cannot be sorted since processes of assigning sequence numbers to data packets in respective frequency bands are separate from each other during multi-band transmission, thereby ensuring normal sorting of the multiple data packets and thus obtaining target data for service.

Figure 9:
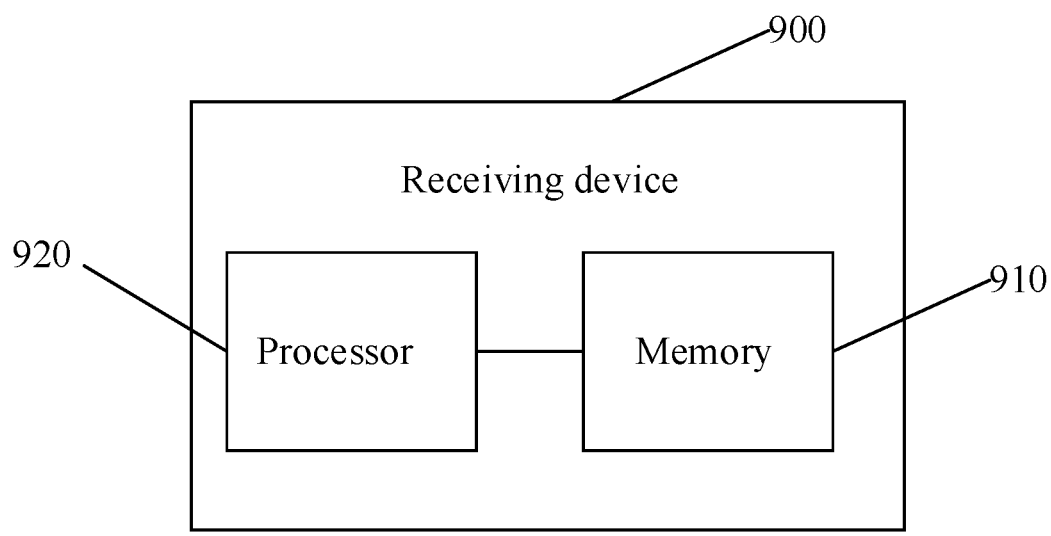
FIG. 9 is a schematic diagram of a receiving device according to an embodiment of the present disclosure.

FIG. 9 is a schematic diagram of a receiving device according to an embodiment of the present disclosure. Referring to FIG. 9, the receiving device 900 according to the embodiment of the present disclosure may include a memory 910 and a processor 920. The memory 910 can store a computer program. When the computer program is executed by the processor 920, steps in any preceding method for processing data packets which is applied to the receiving device can be performed. For example, when the computer program is executed by the processor 920, the following operations are performed: receiving multiple data packets of an identical service which are transmitted in multiple frequency bands, where each of the multiple data packets carries arrangement indication information; sorting the multiple data packets based on the arrangement indication information to obtain a data packet sequence; and processing the data packet sequence to obtain target data.

In the embodiment of the present disclosure, after the receiving device acquires the multiple data packets transmitted in the multiple frequency bands, since each of the multiple data packets carries the arrangement indication information, the receiving device can sort the multiple data packets by using the arrangement indication information carried in each of the multiple data packets. Therefore, it is able to solve the problem that data packets cannot be sorted since processes of assigning sequence numbers to data packets in respective frequency bands are separate from each other during multi-band transmission, thereby ensuring normal sorting of the data packets and thus obtaining target data for service.

Moreover, embodiments of the present disclosure may further provide a non-transitory computer-readable storage medium. The storage medium stores a computer program. When the computer program is executed, steps in any preceding method for processing data packets applied to a sending device are performed. For example, when the computer program is executed, the following operations are performed: causing each of multiple data packets of an identical service to carry arrangement indication information; and transmitting the multiple data packets in multiple frequency bands, where each of the multiple data packets carries the arrangement indication information.

Moreover, embodiments of the present disclosure may further provide a non-transitory computer-readable storage medium. The storage medium stores a computer program. When the computer program is executed, steps in any preceding method for processing data packets applied to a receiving device are performed. For example, when the computer program is executed, the following operations are performed: receiving multiple data packets of an identical service which are transmitted in multiple frequency bands, where each of the multiple data packets carries arrangement indication information; sorting the multiple data packets based on the arrangement indication information to obtain a data packet sequence; and processing the data packet sequence to obtain target data.

In embodiments of the present disclosure, with the non-transitory computer-readable storage medium, the sending device may cause each to-be-sent data packet to carry the arrangement indication information and send the data packets containing the arrangement indication information in multiple frequency bands. In this manner, after the receiving device acquires the multiple data packets transmitted in the multiple frequency bands, since each of the multiple data packets carries the arrangement indication information, the receiving device can sort the multiple data packets by using the arrangement indication information carried in each of the multiple data packets. Therefore, it is able to solve the problem that data packets cannot be sorted since processes of assigning sequence numbers to data packets in respective frequency bands are separate from each other during multi-band transmission, thereby ensuring normal sorting of the data packets and thus obtaining target data for service.

It is to be understood by those skilled in the art that embodiments of the present disclosure may be provided as methods, apparatuses or computer program products. Therefore, the present disclosure may be implemented as hardware, software, or a combination thereof. Moreover, the present disclosure may take the form of a computer program product implemented in one or more computer-usable storage media (including, but not limited to, a disk memory, a CD-ROM, and an optical memory) that contain computer-usable program codes.

The present disclosure is described with reference to flowcharts and/or block diagrams of methods, devices (systems) and computer program products according to embodiments of the present disclosure. It is to be understood that each flow and/or block in the flowcharts and/or block diagrams and a combination of flows and/or blocks in the flowcharts and/or block diagrams may be implemented using computer program instructions. These computer program instructions may be provided for a processor of a general-purpose computer, a special-purpose computer, an embedded processor, or another programmable data processing device to produce a machine so as to enable the instructions executed by the processor of the computer or another programmable data processing device to generate an apparatus for implementing the functions specified in one or more flows in the flowcharts and/or one or more blocks in the block diagrams.

These computer program instructions may also be stored in a computer-readable memory that can cause the computer or another programmable data processing device to operate in a particular manner so that the instructions stored in the computer-readable memory produce a manufactured product including an instruction apparatus. The instruction apparatus implements the functions specified in the one or more flows in the flowcharts and/or the one or more blocks in the block diagrams.

These computer program instructions may be loaded onto the computer or another programmable data processing device so that a series of operation steps are performed on the computer or another programmable device to produce processing implemented by the computer. Therefore, instructions executed on the computer or another programmable device provide steps for implementing the functions specified in the one or more flows in the flowcharts and/or the one or more blocks in the block diagrams.

In a typical configuration, computing devices include one or more central processing units (CPUs), one or more input/output interfaces, one or more network interfaces, and one or more memories.

The memories may include computer-readable media like a volatile memory, a random access memory (RAM) and/or a non-volatile memory such as a read-only memory (ROM) or a flash RAM. A memory is an example of a computer-readable medium.

The computer-readable media include non-volatile, volatile, removable and immovable media. Information can be stored using any method or technology. The information may be a computer-readable instruction, a data structure, a program module, or other data. Examples of computer storage media include, but are not limited to, a phase-change memory (PRAM), a static random-access memory (SRAM), a dynamic random-access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a magnetic cassette, a magnetic tape, a magnetic disk or other magnetic storage devices, or any other non-transmission medium capable of storing information that can be accessed by a computing device. As defined herein, the computer-readable media do not include transitory computer-readable media such as modulated data signals and carriers.

It is to be noted that as used herein, the term "comprise", "include" or any other variant thereof is intended to encompass a non-exclusive inclusion so that a process, method, article or device that includes a series of elements not only includes the expressly listed elements but also includes other elements that are not expressly listed or are inherent to such a process, method, article or device. In the absence of more restrictions, the elements defined by the statement "including a . . . " do not exclude the presence of additional identical elements in the process, method, article or device that includes the elements.

It is to be understood by those skilled in the art that embodiments of the present disclosure may be provided as methods, systems or computer program products. Therefore, the present disclosure may be implemented as hardware, software, or a combination thereof. Moreover, the present disclosure may take the form of a computer program product implemented in one or more computer-usable storage media (including, but not limited to, a disk memory, a CD-ROM, and an optical memory) that contain computer-usable program codes.

The preceding describes particular embodiments of the present disclosure. Other embodiments are within the scope of the appended claims. In some cases, the actions or steps described in the claims may be performed in an order different from the order in the embodiments, with the desired results still achievable. Moreover, the desired results are achievable even when the processes depicted in the drawings are not performed in the illustrated particular order or consecutive order. In some embodiments, multitasking and parallel processing are also possible or may be advantageous.

What is claimed is:

1. A method for processing data packets, applied to a receiving device, comprising:
   receiving a plurality of data packets of an identical service which are transmitted in a plurality of frequency bands, wherein each of the plurality of data packets carries arrangement indication information; and
   sorting the plurality of data packets based on the arrangement indication information carried in each of the plurality of data packets;
   wherein the arrangement indication information comprises data packet continuity indication information and frequency band indication information; and
   wherein sorting the plurality of data packets based on the arrangement indication information carried in the each of the plurality of data packets comprises:

determining a first sent data packet from the plurality of data packets; and sorting the plurality of data packets starting from a next data packet of the first sent data packet based on a sequence number, the data packet continuity indication information, and the frequency band indication information carried in each of the plurality of data packets; and wherein sorting the plurality of data packets based on the sequence number, the data packet continuity indication information, and the frequency band indication information carried in each of the plurality of data packets comprises:

determining one data packet from the plurality of data packets to be a to-be-sorted target data packet, wherein the to-be-sorted target data packet is an unsorted data packet after the first sent data packet, and data packets before the to-be-sorted target data packet and in a frequency band in which the to-be-sorted target data packet is located have all been sorted;

determining whether the data packet continuity indication information carried in the to-be-sorted target data packet indicates that the to-be-sorted target data packet and a previous data packet of the to-be-sorted target data packet are transmitted continuously; and in response to the data packet continuity indication information carried in the to-be-sorted target data packet indicating that the to-be-sorted target data packet and the previous data packet of the to-be-sorted target data packet are transmitted continuously, sorting the to-be-sorted target data packet, and determining a next unsorted data packet in the frequency band in which the to-be-sorted target data packet is located to be a new to-be-sorted target data packet.

2. The method of claim 1, wherein the data packet continuity indication information indicates whether a data packet carrying the data packet continuity indication information and a previous data packet of the data packet carrying the data packet continuity indication information are transmitted continuously, and the frequency band indication information indicates an identifier of a frequency band in which a previous data packet of a data packet carrying the frequency band indication information is located.

3. The method of claim 2, wherein determining the first sent data packet from the plurality of data packets comprises: determining the first sent data packet based on the sequence number and the frequency band indication information of each of the plurality of data packets.

4. The method of claim 3, wherein determining the first sent data packet based on the sequence number and the frequency band indication information of each of the plurality of data packets comprises:

acquiring, from the plurality of data packets, a data packet having a minimum sequence number transmitted in each of the plurality of frequency bands; and from data packets having the minimum sequence number transmitted in the plurality of frequency bands, determining a data packet whose frequency band indication information indicates an identifier that is the same as an identifier of a frequency band in which the data packet is located to be the first sent data packet.

5. The method of claim 1, wherein sorting the plurality of data packets based on the sequence number, the data packet continuity indication information, and the frequency band indication information carried in each of the plurality of data packets further comprises:

in response to the data packet continuity indication information carried in the to-be-sorted target data packet indicating that the to-be-sorted target data packet and the previous data packet of the to-be-sorted target data packet are transmitted discontinuously, acquiring an unsorted data packet having a minimum sequence number in each frequency band other than the frequency band in which the to-be-sorted target data packet is located; and acquiring a target specified data packet from all unsorted data packets having minimum sequence numbers in frequency bands other than the frequency band in which the to-be-sorted target data packet is located, sorting the target specified data packet, and determining a next data packet in a frequency band in which the target specified data packet is located to be a new to-be-sorted target data packet, wherein the target specified data packet is a data packet whose frequency band indication information indicates an identifier that is the same as an identifier of a frequency band in which a last data packet that has been sorted is located.

6. The method of claim 5, wherein acquiring the target specified data packet from all unsorted data packets having minimum sequence numbers in frequency bands other than the frequency band in which the to-be-sorted target data packet is located comprises:

acquiring a specified data packet which is present in all the unsorted data packets having the minimum sequence numbers in the frequency bands other than the frequency band in which the to-be-sorted target data packet is located, wherein the specified data packet is a data packet whose frequency band indication information indicates an identifier that is the same as the identifier of the frequency band in which the last data packet that has been sorted is located;

in response to one specified data packet being acquired, determining the one specified data packet to be the target specified data packet; and in response to a plurality of specified data packets being acquired, determining one specified data packet from the plurality of specified data packets to be the target specified data packet.

7. The method of claim 6, wherein determining one specified data packet from the plurality of specified data packets to be the target specified data packet comprises:

selecting one specified data packet from the plurality of specified data packets to be a test data packet and determining the test data packet to be the to-be-sorted target data packet;

determining whether the data packet continuity indication information carried in the to-be-sorted target data packet indicates that the to-be-sorted target data packet and a previous data packet of the to-be-sorted target data packet are transmitted continuously;

in response to the data packet continuity indication information carried in the to-be-sorted target data packet indicating that the to-be-sorted target data packet and the previous data packet of the to-be-sorted target data packet are transmitted continuously, sorting the to-be-sorted target data packet, and determining the next unsorted data packet in the frequency band in which the to-be-sorted target data packet is located to be the new to-be-sorted target data packet to continue sorting;

in response to the data packet continuity indication information carried in the to-be-sorted target data packet indicating that the to-be-sorted target data packet and the previous data packet of the to-be-sorted target data packet are transmitted discontinuously, acquiring the unsorted data packet having the minimum sequence number in each frequency band other than the frequency band in which the to-be-sorted target data packet is located, and determining whether a specific data packet is present in all the unsorted data packets having the minimum sequence numbers in the frequency bands other than the frequency band in which the to-be-sorted target data packet is located, wherein the specific data packet is a data packet whose frequency band indication information indicates an identifier that is the same as an identifier of a frequency band in which the current to-be-sorted target data packet is located; and in response to the specific data packet being present, determining a next data packet in a frequency band in which the specific data packet is located to be the new to-be-sorted target data packet to continue sorting; and in response to the specific data packet being always present throughout a sorting process, determining the test data packet to be the target specified data packet.

8. The method of claim 7, wherein determining one specified data packet from the plurality of specified data packets to be the target specified data packet further comprises:

in response to the specific data packet being not present, determining the test data packet not to be the target specified data packet and determining another data packet from the plurality of specified data packets to be a test data packet.

9. A receiving device, comprising a memory and a processor, wherein the memory stores a computer program, and the processor is configured to execute the computer program to perform steps in the method for processing data packets according to claim 1.

10. A non-transitory computer-readable storage medium, the storage medium storing a computer program configured to, when executed, implement steps in the method for processing data packets according to claim 1.

11. A method for processing data packets, applied to a sending device, comprising:

causing each of a plurality of data packets of an identical service to carry arrangement indication information; and transmitting the plurality of data packets in a plurality of frequency bands, whereby a receiving device sorts the plurality of data packets based on the arrangement indication information carried in each of the plurality of data packets;

wherein the arrangement indication information comprises data packet continuity indication information and frequency band indication information; and wherein sorting the plurality of data packets based on the arrangement indication information carried in each of the plurality of data packets comprises:

determining a first sent data packet from the plurality of data packets; and sorting the plurality of data packets starting from a next data packet of the first sent data packet based on a sequence number, the data packet continuity indication information, and the frequency band indication information carried in each of the plurality of data packets; and wherein sorting the plurality of data packets based on the sequence number, the data packet continuity indication information, and the frequency band indication information carried in each of the plurality of data packets comprises:

determining one data packet from the plurality of data packets to be a to-be-sorted target data packet, wherein the to-be-sorted target data packet is an unsorted data packet after the first sent data packet, and data packets before the to-be-sorted target data packet and in a frequency band in which the to-be-sorted target data packet is located have all been sorted;

determining whether the data packet continuity indication information carried in the to-be-sorted target data packet indicates that the to-be-sorted target data packet and a previous data packet of the to-be-sorted target data packet are transmitted continuously; and in response to the data packet continuity indication information carried in the to-be-sorted target data packet indicating that the to-be-sorted target data packet and the previous data packet of the to-be-sorted target data packet are transmitted continuously, sorting the to-be-sorted target data packet, and determining a next unsorted data packet in the frequency band in which the to-be-sorted target data packet is located to be a new to-be-sorted target data packet.

12. The method of claim 11, wherein the frequency band indication information indicates an identifier of a frequency band in which a previous data packet of a data packet carrying the frequency band indication information is located; and the data packet continuity indication information indicates whether a data packet carrying the data packet continuity indication information and a previous data packet of the data packet carrying the data packet continuity indication information are transmitted continuously in a same frequency band.

13. A sending device, comprising a memory and a processor, wherein the memory stores a computer program, and the processor is configured to execute the computer program to perform steps in the method for processing data packets according to claim 11.

14. A non-transitory computer-readable storage medium, the storage medium storing a computer program configured to, when executed, implement steps in the method for processing data packets according to claim 11.

* * * * *